(12) United States Patent
Kalnes

(10) Patent No.: US 9,193,926 B2
(45) Date of Patent: Nov. 24, 2015

(54) FUEL COMPOSITIONS AND METHODS BASED ON BIOMASS PYROLYSIS

(75) Inventor: Tom N. Kalnes, LaGrange, IL (US)

(73) Assignee: UOP LLC, Des Plaines, IL (US)

( * ) Notice: Subject to any disclaimer, the term of this patent is extended or adjusted under 35 U.S.C. 154(b) by 556 days.

(21) Appl. No.: 12/969,263

(22) Filed: Dec. 15, 2010

(65) Prior Publication Data

US 2012/0151824 A1 Jun. 21, 2012

(51) Int. Cl.
| | |
|---|---|
| *C10L 1/00* | (2006.01) |
| *C10L 1/18* | (2006.01) |
| *C10L 1/02* | (2006.01) |
| *C10B 53/02* | (2006.01) |
| *C10C 5/00* | (2006.01) |
| *C10G 1/02* | (2006.01) |
| *C10G 1/06* | (2006.01) |
| *C10G 1/08* | (2006.01) |
| *C10L 1/182* | (2006.01) |
| *C10G 3/00* | (2006.01) |
| *C10L 1/16* | (2006.01) |

(52) U.S. Cl.
CPC ............ *C10L 1/023* (2013.01); *C10B 53/02* (2013.01); *C10C 5/00* (2013.01); *C10G 1/02* (2013.01); *C10G 1/06* (2013.01); *C10G 1/08* (2013.01); *C10G 3/42* (2013.01); *C10G 3/50* (2013.01); *C10L 1/1824* (2013.01); *C10G 2300/104* (2013.01); *C10G 2300/1014* (2013.01); *C10G 2300/202* (2013.01); *C10G 2300/301* (2013.01); *C10G 2300/305* (2013.01); *C10G 2300/4043* (2013.01); *C10G 2400/02* (2013.01); *C10G 2400/04* (2013.01); *C10G 2400/08* (2013.01); *C10L 1/1616* (2013.01); *C10L 1/18* (2013.01); *C10L 2200/0423* (2013.01); *C10L 2200/0469* (2013.01); *C10L 2290/02* (2013.01); *Y02E 50/14* (2013.01); *Y02E 50/32* (2013.01)

(58) Field of Classification Search
CPC ............ C10B 53/02; C10C 5/00; C10G 1/02; C10G 1/06; C10G 1/08; C10G 2300/1014; C10G 2300/104; C10G 2300/202; C10G 2300/301; C10G 2300/305; C10G 2300/4043; C10G 2400/02; C10G 2400/04; C10G 2400/08; C10G 3/42; C10G 3/50; C10L 1/023; C10L 1/1616; C10L 1/18; C10L 1/1824; C10L 2200/0423; C10L 2200/0469; C10L 2290/02; Y02E 50/14; Y02E 50/32
USPC ............ 44/307, 308, 451; 208/16, 17; 585/14
See application file for complete search history.

(56) References Cited

U.S. PATENT DOCUMENTS

| | | | |
|---|---|---|---|
| 4,210,103 A | 7/1980 | Dimitroff et al. | |
| 4,670,613 A | 6/1987 | Ruyter et al. | |
| 4,836,146 A | 6/1989 | Russell et al. | |
| 4,992,605 A | 2/1991 | Craig | |
| 5,180,868 A | 1/1993 | Baker et al. | |
| 5,208,402 A * | 5/1993 | Wilson ............................. | 585/1 |
| 5,904,838 A * | 5/1999 | Kalnes et al. ................. | 208/179 |
| 5,961,786 A | 10/1999 | Freel et al. | |
| 7,578,927 B2 | 8/2009 | Marker et al. | |
| 7,619,012 B2 | 11/2009 | Norbeck et al. | |
| 7,819,930 B2 | 10/2010 | Adams et al. | |
| 2005/0032920 A1 | 2/2005 | Norbeck et al. | |
| 2005/0256212 A1 | 11/2005 | Norbeck et al. | |
| 2006/0186020 A1 | 8/2006 | Gomes | |
| 2007/0039240 A1 | 2/2007 | Carroway | |
| 2007/0161832 A1 | 7/2007 | Myllyoja et al. | |
| 2008/0092436 A1 | 4/2008 | Seames et al. | |
| 2008/0244962 A1 | 10/2008 | Abhari et al. | |
| 2008/0312480 A1 | 12/2008 | Dindi et al. | |
| 2009/0000185 A1 | 1/2009 | Aulich et al. | |
| 2009/0077865 A1 | 3/2009 | Kalnes et al. | |
| 2009/0077866 A1 | 3/2009 | Kalnes et al. | |
| 2009/0077868 A1 | 3/2009 | Brady et al. | |
| 2009/0107031 A1 | 4/2009 | Connor | |
| 2009/0218062 A1 | 9/2009 | Schinski et al. | |
| 2009/0229172 A1 | 9/2009 | Brady et al. | |

(Continued)

FOREIGN PATENT DOCUMENTS

| | | |
|---|---|---|
| CA | 536549 A | 1/1957 |
| EP | 0450861 A2 | 10/1991 |

(Continued)

OTHER PUBLICATIONS

Demirbas et al. "Conversion of Biomass to a Pyrolytic Oil for Blending Gasoline as an Alternative Fuel in Internal Combustion Engines". Energy Sources. 2001. pp. 553-562.*

(Continued)

*Primary Examiner* — James Goloboy
*Assistant Examiner* — Latosha Hines

(57) ABSTRACT

Fuel compositions exhibiting reduced greenhouse gas (GHG) emissions, based on a lifecycle assessment from the time of cultivation of feedstocks (in the case of plant materials) or extraction of feedstocks (in the case of fossil fuels) required for the compositions (up to and including the ultimate combustion of the fuel composition by the end user) are disclosed. The reduced level of emissions ("carbon footprint") is achieved by incorporating a pyrolysis derived component having a higher heating value than ethanol and meeting other applicable standards for fossil fuel (e.g., petroleum) derived components conventionally used for the same purpose, such as transportation fuels. Advantageously, fuel compositions comprising pyrolysis derived gasoline can exhibit lower GHG emissions than gasoline derived solely from petroleum, or even conventional blends of petroleum derived gasoline and ethanol.

20 Claims, No Drawings

(56) References Cited

U.S. PATENT DOCUMENTS

| | | |
|---|---|---|
| 2009/0229174 A1 | 9/2009 | Brady et al. |
| 2009/0283442 A1 | 11/2009 | McCall et al. |
| 2009/0300970 A1 | 12/2009 | Perego et al. |
| 2009/0321311 A1 | 12/2009 | Marker et al. |
| 2010/0076238 A1 | 3/2010 | Brandvold et al. |
| 2010/0160698 A1 | 6/2010 | Perego et al. |

FOREIGN PATENT DOCUMENTS

| | | |
|---|---|---|
| EP | 0510771 A1 | 10/1992 |
| EP | 0718392 A1 | 6/1996 |
| WO | 0176736 A1 | 10/2001 |
| WO | 0202489 A1 | 1/2002 |
| WO | 0207882 A1 | 1/2002 |
| WO | 2004005438 A1 | 1/2004 |
| WO | 2006070018 A1 | 7/2006 |
| WO | 2006100584 A2 | 9/2006 |
| WO | 2008035155 A2 | 3/2008 |
| WO | 2008104929 A1 | 9/2008 |
| WO | 2008124852 A2 | 10/2008 |

OTHER PUBLICATIONS

Bridgwater, "Principles and practice of biomass fast pyrolysis processes for liquids", Journal of Analytical and Applied Pyrolysis, 1999, vol. 51, pp. 3-22.

Higman, C. et al.; Chapter 5, "Gassification Processes"; Library of Congress Cataloging-in-Publication Data, ISBN-13: 978-0-7506-7707-3, ISBN-10: 0-7506-7707-4 (hc: alk. paper), 1. Coal gassification, I. Burgt, Maarten van der, II. Title., TP759.H54 2003, 665.7'72-dc21; p. 85-170 (2003).

Demirbas, Ayhan; "Conversion of biomass to a pyrolytic oil for blending gasoline as an alternative fuel in internal combustion engines"; Source: Energy Sources, v. 23, n. 6, p. 553-562, Jul. 2001.

Bridgwater, A.V.; "Biomass Fast Pyrolysis"; Source: Review paper BIBLID: 0354-9836, 8 (2004), 2, 21-49.

Gregor, J.H.; UOP Inc; Sasol Ltd; "Fischer-Tropsch [synthesis (TDS)] products as liquid fuels or chemicals. An economic evaluation"; Source: AIChE 1990 Spring National Meeting (Orlando Mar. 18-22, 1990) Catalysis Letters (ISSN 1011—372X) v. 7, n. 1-4, p. 317-31 (Nov. 1990); Kluwer academic Publishers.

Liu, D.D.S. et al; "Production of high quality cetane enhancer from depitched tall oil"; Source: AIChE 1996 National Meeting (Chicago Nov. 10-15, 1995) (Condensation) Petroleum Science and Technology (ISSN 1091-6466), v. 16, n. 5-6, p. 597-609 (1998).

Srivastava, Anjana et al.; "Triglycerides-based diesel fuels"; H.B. Technological Inst; Source: Renewable and Sustainable energy Reviews, v. 4, n. 2, p. 111-133 (2000).

Banapurmath, N.R. et al.; "Experimental investigations of a four-stroke single cylinder direct injection diesel engine operated on dual fuel mode with producer gas as inducted fuel and Honge oil and its methyl ester (HOME) as injected fuels"; Source: Renewable Energy, v. 33, n. 9, p. 2007-2018; Elsevier Ltd (2008).

Demirbas, A.; "Production of biodiesel from tall oil"; Source: Energy Sources, Part A; Recovery, Utilization and Environmental Effects, v. 30, n. 20, p. 1896-1902; Taylor and Francis Inc. (2008).

Marker, T.L. et al.; "Green Diesel Production from Vegetable Oil"; UOP LLC, 25 E. Algonquin Rd., Des Plaines, IL 60017, Refining Process Development; Refining, Eni, Milan, Italy, 2007.

Neaves, D.E. et al.; "Evaluation of tall oil as a feedstock for the production of biodiesel"; Source: AIChE Annual Meeting, Conference Proceedings 2006 p. 1, 2006 AIChE Annual Meeting, 2006, San Francisco, CA American Institute of Chemical Engineers.

Keskin, A. et al.; "Influence of tall oil biodiesel with Mg and Mo based fuel additives on diesel engine performance and emission"; Source: Bioresource Technology, v. 99, n. 14, p. 6434-6438; Elsevier Ltd (2008).

Thisdell, G.; "Rintenko: Finland: Designs on engineering renewable technology"; Source: European Chemical News, v. 83, n. 2172, p. 31; Reed Business Information Ltd (2005).

Keskin, A. et al.; "Biodiesel production from tall oil with synthesized Mn and Ni based additives: Effects of the additives on fuel consumption and emissions"; Source: Fuel, v. 86, n. 7/8, p. 1139-1143; Elsevier Ltd (2007).

Karabektas, M. et al.; "The effects of preheated cottonseed oil methyl ester on the performance and exhaust emissions of a diesel engine"; Source: Applied Thermal Engineering, v. 28, n. 17/18, p. 2136-2143; Elsevier Ltd (2008).

Herman, U. et al.; "Green Diesel from Biomass via Fischer-Tropsch synthesis: New Insights in Gas Cleaning and process Design Harold Boerrigter"; Energy Research Centre of the Netherland (ECN); Shell Global Solutions International B.V., The Hague, The Netherlands, www.senternovem.nl/mmfiles/28277 tcm24-279917.pdf, 2002.

Rajvanshi, A.K.; "Biomass Gasification"; Ch. 4 of Alternative Energy in Agriculture, v. II, p. 83-102, CRC Press (1986).

\* cited by examiner

FUEL COMPOSITIONS AND METHODS BASED ON BIOMASS PYROLYSIS

FIELD OF THE INVENTION

The present invention relates to fuel compositions comprising at least one component derived from the pyrolysis of a renewable feedstock comprising biomass (e.g., wood or agricultural waste). The present invention also relates to methods for making these fuel compositions comprising pyrolysis and hydroprocessing, optionally with hydrogen generated from byproducts of either or both of these processes, in order to further reduce the carbon footprint of the fuel composition.

DESCRIPTION OF RELATED ART

Environmental concerns over fossil fuel greenhouse gas emissions have led to an increasing emphasis on renewable energy sources. Wood and other forms of biomass including agricultural and forestry residues are examples of some of the main types of renewable feedstocks being considered for the production of liquid fuels. Energy from biomass based on energy crops such as short rotation forestry, for example, can contribute significantly towards the objectives of the Kyoto Agreement in reducing greenhouse gas (GHG) emissions.

Pyrolysis is considered a promising route for obtaining liquid fuels, including transportation fuel and heating oil, from biomass feedstocks. Pyrolysis refers to thermal decomposition in the substantial absence of oxygen (or in the presence of significantly less oxygen than required for complete combustion). Initial attempts to obtain useful oils from biomass pyrolysis yielded predominantly an equilibrium product slate (i.e., the products of "slow pyrolysis"). In addition to the desired liquid product, roughly equal proportions of non-reactive solids (char and ash) and non-condensible gases were obtained as unwanted byproducts. More recently, however, significantly improved yields of primary, non-equilibrium liquids and gases (including valuable chemicals, chemical intermediates, petrochemicals, and fuels) have been obtained from carbonaceous feedstocks through fast (rapid or flash) pyrolysis at the expense of undesirable, slow pyrolysis products.

Fast pyrolysis refers generally to technologies involving rapid heat transfer to the biomass feedstock, which is maintained at a relatively high temperature for a very short time. The temperature of the primary pyrolysis products is then rapidly reduced before chemical equilibrium is achieved. The fast cooling therefore prevents the valuable reaction intermediates, formed by depolymerization and fragmentation of the biomass building blocks, namely cellulose, hemicellulose, and lignin, from degrading to non-reactive, low-value final products. A number of fast pyrolysis processes are described in U.S. Pat. No. 5,961,786; Canadian Patent Application 536,549; and by Bridgwater, A.V., "Biomass Fast Pyrolysis," Review paper BIBLID: 0354-9836, 8 (2004), 2, 21-49. Fast pyrolysis processes include Rapid Thermal Processing (RTP), in which an inert or catalytic solid particulate is used to carry and transfer heat to the feedstock. RTP has been commercialized and operated with very favorable yields (55-80% by weight, depending on the biomass feedstock) of raw pyrolysis oil.

The raw pyrolysis oil typically contains a relatively high oxygen content and relatively low energy content, compared to petroleum derived liquid fuel components. Other properties of this oil render it generally unusable, in any appreciable proportion, as a component of a transportation fuel composition. Significant upgrading, however, may be achieved by hydroprocessing of the raw pyrolysis oil. Despite recent progress in the area of biofuel development, there remains a need in the art for fuel compositions, and particularly those useful as motor fuels, which are derived at least partly from renewable feedstocks such as biomass. Of significant interest are compositions having a minimal carbon footprint, based on a lifecycle assessment of their greenhouse gas emissions.

SUMMARY OF THE INVENTION

The present invention is associated with the discovery of fuel compositions exhibiting reduced greenhouse gas (GHG) emissions, based on a lifecycle assessment from the time of cultivation of feedstocks (in the case of plant materials) or extraction of feedstocks (in the case of fossil fuels) required for the compositions, up to and including the ultimate combustion of the fuel composition by the end user. This reduced level of emissions ("carbon footprint") is achieved by incorporating a pyrolysis derived component having a higher heating value than ethanol and meeting other standards applicable to fossil fuel (e.g., petroleum) derived components conventionally used for the same purpose, such as transportation fuels. Advantageously, fuel compositions comprising pyrolysis derived gasoline as the pyrolysis derived component can exhibit lower GHG emissions than gasoline derived solely from petroleum, or even conventional blends of petroleum derived gasoline and ethanol.

Embodiments of the invention therefore relate to fuel compositions, and especially motor fuel compositions, comprising a blend of components including a pyrolysis derived component, which may be present in the composition in an amount of typically up to about 50% by weight. While such compositions may comprise entirely one or more pyrolysis derived components (i.e., in a neat form with respect to the pyrolysis derived component(s)), the compositions generally comprise blends of at least one pyrolysis derived component and at least one petroleum derived component. Relatively high proportions of the pyrolysis derived component(s) (i.e., greater than 50% by weight) will be primarily a function of the commercial scale production volumes that may ultimately be achieved using pyrolysis, compared to petroleum refining. By blending pyrolysis derived gasoline (pygas) with conventional petroleum derived gasoline according to fuel compositions described herein, the carbon footprint of the blend can be reduced.

Other embodiments of the invention relate to novel production methods for these pyrolysis derived components of fuel compositions, in which the components have not only a higher heating value than ethanol, but also a lifecycle GHG emission value that is reduced by generally at least about 30%, typically at least about 50%, and often at least about 65%, relative to comparable petroleum derived fuel composition components. Pyrolysis derived gasoline, for example, may exhibit GHG emissions, based on a lifecycle assessment, that are over 70% lower than petroleum derived gasoline obtained from crude oil fractionation and/or refining operations (e.g., isomerization, alkylation, reforming, etc.) and over 50% lower than corn derived ethanol.

Representative production methods include the pyrolysis of second generation (e.g., lignocellulosic) biomass feedstocks to raw pyrolysis oil, followed by catalytic hydroprocessing of this oil, which may be optionally pretreated prior to hydroprocessing. Hydroprocessing of the raw or pretreated pyrolysis oil significantly reduces its total oxygen content and increases its heating value. The methods can further comprise separating the resulting hydroprocessed pyrolysis oil, for example, by fractionation (distillation), to provide one or more hydroprocessed pyrolysis oil fractions (e.g., pyrolysis derived gasoline) comprising hydrocarbons having normal boiling points characteristic of petroleum derived hydrocarbons with which they are blended in a subsequent blending step to provide the fuel compositions described herein. According to an alternate embodiment, the raw pyrolysis oil may be fractionated prior to hydroprocessing of only a desired pyrolysis oil (raw or pretreated) fraction, to yield the desired pyrolysis derived gasoline.

Regardless of the order of the separating and hydroprocessing (contacting with hydrogen) steps, at least a portion of the raw or pretreated pyrolysis oil and/or at least a portion of the hydroprocessed pyrolysis oil (or hydroprocessed pyrolysis oil fraction) is converted to hydrogen (e.g., by catalytic steam reforming), thereby generating at least a portion of the hydrogen required for hydroprocessing. The generation of hydrogen from byproducts (e.g., light hydrocarbons) of the pyrolyzing and/or hydroprocessing steps, can involve, in an overall pyrolysis derived component production process, integration with a hydrogen generation unit. In an exemplary embodiment, a catalytic steam reformer is integrated with a pyrolysis unit, for example a Rapid Thermal Processing (RTP) unit, and/or a catalytic hydroprocessing unit. Importantly, the generation of hydrogen in this manner (i.e., from byproducts obtained from the processing of feedstocks comprising renewable carbon) beneficially reduces the amount of hydrogen that must be obtained from external fossil sources (imported), thereby further lowering the lifecycle GHG emission value of the pyrolysis derived component.

Further embodiments of the invention relate to methods of preparing fuel compositions described herein, the methods comprising blending a pyrolysis derived component, and particularly a component produced according to methods described herein, with a petroleum derived component. Representative amounts of the pyrolysis and petroleum derived components are also described herein.

These and other embodiments and aspects relating to the present invention are apparent from the following Detailed Description.

DETAILED DESCRIPTION

Representative fuel compositions according to embodiments of the invention comprise from about 1% to about 50% of a pyrolysis derived component, such as pyrolysis derived gasoline, by weight. A particular fuel composition, for example, may comprise from 1% to about 30% pyrolysis derived gasoline by weight, in addition to from about 50% to 98% or more (e.g., from about 50% to about 99%) petroleum derived gasoline by weight and optionally ethanol. When ethanol is incorporated into the composition, it is typically derived from corn or sugar and present in an amount from 1% to about 20% by volume. As discussed above, the reduced lifecycle greenhouse gas (GHG) emission value of the pyrolysis derived component has a beneficial effect on the overall carbon footprint of the fuel composition. Moreover, as a result of being obtained from a combination of hydroprocessing in addition to pyrolysis, this component has a higher heating value than ethanol, among other properties (e.g., density and boiling range) meeting the standards established for petroleum derived components conventionally used for the same purpose (e.g., as a transportation fuel such as gasoline or diesel fuel). Of particular interest with respect to the compositions described herein are automotive spark-ignition engine fuels.

According to representative embodiments of the invention, the biomass subjected to pyrolysis in an oxygen depleted environment, for example using Rapid Thermal Processing (RTP), can be any plant material, or mixture of plant materials, including a hardwood (e.g., whitewood), a softwood, or a hardwood or softwood bark. Energy crops, or otherwise agricultural residues (e.g., logging residues) or other types of plant wastes or plant-derived wastes, may also be used as plant materials. Specific exemplary plant materials include corn fiber, corn stover, and sugar cane bagasse, in addition to "on-purpose" energy crops such as switchgrass, miscanthus, and algae. Short rotation forestry products, as energy crops, include alder, ash, southern beech, birch, eucalyptus, poplar, willow, paper mulberry, Australian blackwood, sycamore, and varieties of paulownia elongate. Other examples of suitable biomass include organic waste materials, such as waste paper and construction, demolition, and municipal wastes. In general, the pyrolysis derived component (e.g., pyrolysis derived gasoline) may be obtained from any feedstock comprising lignocellulosic biomass. Because the biomass feedstocks are composed of the same building blocks, namely cellulose, hemi-cellulose, and lignin, pyrolysis conditions are relatively similar in the production of raw pyrolysis oils from these various feedstocks.

The raw pyrolysis oil obtained from a feedstock comprising biomass, as described above, generally contains 30-35% by weight of oxygen in the form of organic oxygenates such as hydroxyaldehydes, hydroxyketones, sugars, carboxylic acids, and phenolic oligomers as well as dissolved water. For this reason, although a pourable and transportable liquid fuel, the raw pyrolysis oil has only about 55-60% of the energy content of crude oil-based fuel oils. Representative values of the energy content are in the range from about 19.0 MJ/liter (69,800 BTU/gal) to about 25.0 MJ/liter (91,800 BTU/gal). Moreover, this raw product is often corrosive and exhibits chemical instability due to the presence of highly unsaturated compounds such as olefins (including diolefins) and alkenylaromatics. Hydroprocessing of this pyrolysis oil is therefore beneficial in terms of reducing its oxygen content and increasing its stability, thereby rendering the hydroprocessed product more suitable for blending in fuels, such as gasoline, meeting all applicable specifications. Hydroprocessing involves contacting the pyrolysis oil with hydrogen and in the presence of a suitable catalyst, generally under conditions sufficient to convert a large proportion of the organic oxygen in the raw pyrolysis oil to CO, $CO_2$ and water that are easily removed. The term "pyrolysis oil," as it applies to a feedstock to the hydroprocessing step, refers to the raw pyrolysis oil obtained directly from pyrolysis (e.g., RTP) or otherwise refers to this raw pyrolysis oil after having undergone pretreatment such as filtration to remove solids and/or ion exchange to remove soluble metals, prior to the hydroprocessing step.

The catalyst may be present in the form of a fixed bed of particles comprising a catalytically active metal disposed on a support, with suitable metals and supports being described below. Otherwise the catalyst, either supported or otherwise unsupported (e.g., in the form of fine particles of a compound containing the catalytically active metal), may be used in a moving bed, such as in the case of a slurry reactor. Homogeneous systems operating with catalysts that are soluble in the reactants and products may also be used. Catalytic hydroprocessing conditions will vary depending on the quality of the hydroprocessed pyrolysis oil desired, with higher severity operations directionally resulting in greater conversion of organic oxygenates and other undesirable compounds (e.g., reactive olefins and diolefins) by hydrogenation.

Typical pyrolysis oil hydroprocessing conditions include an average catalyst bed temperature from about 40° C. (104° F.) to about 538° C. (1000° F.), often from about 150° C. (302° F.) to about 426° C. (800° F.), and a hydrogen partial pressure from about 3.5 MPa (500 psig) to about 21 MPa (3000 psig), often from about 6.2 MPa (800 psig) to about 10.5 MPa (1500 psig). In addition to pressure and temperature, the residence time of the pyrolysis oil in the hydroprocessing catalyst bed or zone can also be adjusted to increase or decrease the reaction severity and consequently the quality of the resulting hydroprocessed pyrolysis oil. With all other variables unchanged, lower residence times are associated with lower reaction severity. The inverse of the residence time is closely related to a variable known as the Liquid Hourly Space Velocity (LHSV, expressed in units of $hr^{-1}$), which is the volumetric liquid flow rate over the catalyst bed divided by the bed volume and represents the equivalent number of catalyst bed volumes of liquid processed per hour. Therefore, increasing the LHSV or pyrolysis oil flow rate, processed over a given quantity of catalyst, directionally decreases residence time and the conversion of undesirable compounds present in this oil, such as organic oxygenate compounds. A typical range of LHSV for hydroprocessing according to the present invention is from about $0.1\ hr^{-1}$ to about $10\ hr^{-1}$, often from about $0.5\ hr^{-1}$ to about $3\ hr^{-1}$. The quantity of hydrogen used may be based on the stoichiometric amount needed to convert organic oxygenates to hydrocarbons and $H_2O$. In representative embodiments, hydroprocessing is carried out in the presence of hydrogen in amount ranging from about 90% to about 600% of this stoichiometric amount.

Suitable hydroprocessing catalysts include those comprising of at least one Group VIII metal, such as iron, cobalt, and nickel (e.g., cobalt and/or nickel) and at least one Group VI metal, such as molybdenum and tungsten, on a high surface area support material such as a refractory inorganic oxide (e.g., silica, alumina, titania, and/or zirconia). A carbon support may also be used. A representative hydroprocessing catalyst therefore comprises a metal selected from the group consisting of nickel, cobalt, tungsten, molybdenum, and mixtures thereof (e.g., a mixture of cobalt and molybdenum), deposited on any of these support materials, or combinations of support materials. The choice of support material may be influenced, in some cases, by the need for corrosion resistance in view of the presence of aqueous acids in the pyrolysis oil feedstock to hydroprocessing.

The Group VIII metal is typically present in the hydroprocessing catalyst in an amount ranging from about 2 to about 20 weight percent, and normally from about 4 to about 12 weight percent, based on the volatile-free catalyst weight. The Group VI metal is typically present in an amount ranging from about 1 to about 25 weight percent, and normally from about 2 to about 25 weight percent, also based on the volatile-free catalyst weight. A volatile-free catalyst sample may be obtained by subjecting the catalyst to drying at 200-350° C. (392-662° F.) under an inert gas purge or vacuum for a period of time (e.g., 2 hours), so that water and other volatile components are driven from the catalyst.

Other suitable hydroprocessing catalysts include zeolitic catalysts, as well as noble metal catalysts where the noble metal is selected from palladium and platinum. It is within the scope of the invention to use more than one type of hydroprocessing catalyst in the same or a different reaction vessel. Two or more hydroprocessing catalyst beds of the same or different catalyst and one or more quench points may also be utilized in a reaction vessel or vessels to provide the hydroprocessed pyrolysis oil.

After hydroprocessing, the resulting hydroprocessed pyrolysis oil has an oxygen content that is generally reduced from about 90% to about 99.9%, relative to the oxygen content of the raw pyrolysis oil. Importantly, the heating value, on a mass basis, of the hydroprocessed pyrolysis oil is simultaneously increased, typically by a factor ranging from about 1.5 to about 3, compared to that of the raw pyrolysis oil. Fractionation or other separation methods may then be used to separate various pyrolysis derived components, such as a pyrolysis derived gasoline, from the hydroprocessed pyrolysis oil. Separation may alternatively be performed on the pyrolysis oil (e.g., raw or pretreated pyrolysis oil as discussed above) and the pyrolysis derived gasoline or other pyrolysis derived component taken as the entire product of the subsequent hydroprocessing operation. In any event, the separated, pyrolysis derived component may then be blended with comparable petroleum derived components and possibly other suitable additives.

In addition to pyrolysis derived gasoline, pyrolysis derived kerosene and/or pyrolysis derived diesel components may also be recovered, normally by fractionation, to provide these components as fractions having successively higher boiling point ranges. Both of the kerosene and diesel components generally have higher boiling point ranges, compared to the gasoline component. Likewise, lower boiling point range components may also be recovered by fractionation. These include, for example, a pyrolysis derived renewable analogue of liquefied petroleum gas (LPG). After hydroprocessing and fractionation, the pyrolysis derived components described above, including pyrolysis derived gasoline, comprise predominantly hydrocarbons, typically at least about 90% hydrocarbons (e.g., from about 90% to about 99.9% hydrocarbons) by weight, and often at least about 97% hydrocarbons (e.g., from about 97% to about 99.5% hydrocarbons) by weight.

Pyrolysis derived gasoline is therefore normally separated from the hydrocarbon-containing products of hydroprocessing, based on boiling point or relative volatility, in a distillation column capable of carrying out a suitable number of theoretical stages of equilibrium contacting between rising vapor and falling liquid. According to representative embodiments, the pyrolysis derived gasoline will have an initial boiling point temperature characteristic of $C_5$ hydrocarbons, for example from about 30° C. (86° F.) to about 40° C. (104° F.) and a distillation end point temperature generally from about 138° C. (280° F.) to about 216° C. (420° F.), and typically from about 138° C. (280° F.) to about 160° C. (320° F.). These boiling point temperatures, which are also characteristic of petroleum derived gasoline, are measured according to ASTM D86.

The pyrolysis derived gasoline component, therefore, may be separated by fractionation from lower boiling hydrocarbons contained in a more volatile component (e.g., pyrolysis derived LPG) and/or higher boiling hydrocarbons contained in a less volatile component (e.g., pyrolysis derived kerosene and/or pyrolysis derived diesel). According to preferred embodiments, the separated, lower boiling hydrocarbons comprise $C_4$ hydrocarbons (e.g., butanes and butenes) as well as lower boiling compounds, such that these lower boiling hydrocarbons may be referred to a $C_4^-$ hydrocarbons. To further reduce the lifecycle greenhouse gas emission value of the pyrolysis derived gasoline or other pyrolysis derived component(s), at least a portion of these biomass-derived $C_4^-$ hydrocarbons are advantageously used to generate at least a portion of the hydrogen requirement for contacting with the raw pyrolysis oil in the hydroprocessing step.

The conversion of the lower boiling hydrocarbons, contained in a less valuable, hydroprocessing product fraction, to hydrogen, can reduce or even eliminate the need for an external source of hydrogen. This external hydrogen would otherwise add to the carbon footprint associated with the production of the pyrolysis derived components described herein, thereby increasing the GHG emissions based on an overall lifecycle assessment. Integrated hydrogen production is therefore beneficial in minimizing the GHG emissions exhibited by the fuel compositions associated with the present invention. According to particular embodiments, the $C_4^-$ hydrocarbons are catalytically reformed in the presence of steam. Representative steam reforming catalysts include alumina supported nickel oxide.

Whether or not integrated hydrogen production is used, the oxygen content remaining in the hydroprocessed pyrolysis oil is a function of the severity of the hydroprocessing operation, with higher severity resulting in a higher conversion of organic oxygenates to water, which may be easily removed. While a reduction in organic oxygenates directionally increases heating value, this improvement in the quality of a pyrolysis derived component is achieved at the expense of increased energy required for the hydroprocessing operation. Optimization of the organic oxygen content is therefore possible, depending on the particular biomass used as feedstock, the particular fuel blend composition, and its intended end use. In the case of pyrolysis derived gasoline, this component will generally contain from about 0.001% to about 5%, typically from about 0.02% to about 4%, and often from about 0.05% to about 3%, by weight of organic oxygenates that are relatively refractory under hydroprocessing conditions. These ranges also apply to cyclic organic oxygenates (e.g., phenol and alkylated phenols), which normally account for most or substantially all of the organic oxygenates of the pyrolysis derived component. The term "cyclic organic oxygenates" is meant to include compounds in which oxygen is incorporated into a ring structure (e.g., a pyran ring), as well as compounds (e.g., phenol) having a ring structure with oxygen being incorporated outside the ring structure. In either case, the ring structure may have from 3 to 8 ring members, be fused to other ring structures, and may be completely saturated (e.g., napthenic), completely unsaturated (e.g., aromatic), or partially unsaturated. In view of these amounts of cyclic oxygenates in the pyrolysis derived gasoline and amounts of this component in the fuel composition, representative fuel compositions will generally contain from about 0.0005% to about 2.5%, typically from about 0.01% to about 2%, and often from about 0.025% to about 1.5%, by weight of cyclic organic oxygenates. According to other embodiments, these ranges may be representative of the total phenol content, including alkylated phenols, in the fuel composition.

In addition to its organic oxygenate content, and particularly its cyclic organic oxygenate content, other properties of the pyrolysis derived gasoline can distinguish this component compositionally from petroleum derived gasoline. For example, pyrolysis derived gasoline is normally characterized by a relatively high content of cyclic hydrocarbons, which is generally from about 50% to about 90%, and typically from about 55% to about 85%. The content of naphthenes, representing the saturated portion of the cyclic hydrocarbons, is generally at least about 30% (e.g., from about 30% to about 80%) by weight and typically at least about 50% (e.g., from about 50% to about 70%) by weight. With respect to the aromatic hydrocarbons in the pyrolysis derived gasoline, benzene and toluene are each typically present in amounts of less than about 2%, and often less than about 1%, by weight. Therefore, according to representative embodiments of the invention, the pyrolysis derived gasoline comprises generally less than about 3%, and typically less than about 2%, by weight of benzene and toluene combined.

The pyrolysis derived gasoline, as well as other pyrolysis derived components (after hydroprocessing) as described above, also advantageously share a number of important characteristics with their petroleum derived counterpart components. In terms of energy content, the pyrolysis derived gasoline has a lower heating value generally from about 30 MJ/kg (12,900 BTU/lb) to about 46 MJ/kg (19,800 BTU/lb) and typically from about 37 MJ/kg (15,900 BTU/lb) to about 44 MJ/kg (18,900 BTU/lb). Additionally, the Research Octane Number (RON) of this component is generally from about 83 to about 93 and typically from about 85 to about 90.

While the pyrolysis derived gasoline can meet the gasoline standards required of petroleum derived gasoline, its carbon footprint is greatly reduced according to U.S. government GHG emission accounting practices, in which emissions associated with the combustion of biomass derived fuels are not reported in the lifecycle GHG emission value, as biomass is renewed over a very short time frame compared to petroleum derived components. According to particular embodiments of the invention, the pyrolysis derived gasoline has a lifecycle greenhouse gas emission value, based on $CO_2$ equivalents, generally from about 5 g $CO_2$-eq./MJ (11.6 lb $CO_2$ eq./mmBTU) to about 50 g $CO_2$-eq./MJ (116.3 lb $CO_2$-eq./mmBTU), typically from about 15 g $CO_2$-eq./MJ (34.9 lb $CO_2$ eq./mmBTU) to about 35 g $CO_2$-eq./MJ (81.3 lb $CO_2$-eq./mmBTU), and often from about 20 g $CO_2$-eq./MJ (46.5 lb $CO_2$-eq./mmBTU) to about 30 g $CO_2$-eq./MJ (69.8 lb $CO_2$-eq /mmBTU), as measured according to guidelines set forth by the Intergovernmental Panel on Climate Change (IPCC) and the U.S. federal government. Lifecycle assessment values of emissions in terms of $CO_2$ equivalents, from raw material cultivation (in the case of plant materials) or raw material extraction (in the case of fossil fuels) through fuel combustion, can be calculated using SimaPro 7.1 software and IPCC GWP 100a methodologies.

In representative fuel compositions associated with the present invention, the pyrolysis derived gasoline may be blended with petroleum derived gasoline that is present in the resulting fuel composition in an amount from about 30% to about 98% by weight. According to particular fuel compositions, (i) generally from 1 to about 50%, and typically from 1 to about 30%, of the pyrolysis derived gasoline by weight is blended with (ii) generally from about 30% to about 99%, and typically from about 50% to about 98% of petroleum derived gasoline by weight, optionally in addition to (iii) generally from 1% to about 30%, and typically from 1% to about 20%, ethanol by volume.

Overall, aspects of the invention are directed to fuel compositions comprising from 1% to about 30% of pyrolysis derived gasoline having a lifecycle greenhouse gas emission value in the ranges given above, methods for making these fuel compositions, and methods for blending these fuel compositions comprising blending the pyrolysis derived gasoline with petroleum derived gasoline, and optionally ethanol, to achieve amounts in the fuel composition as described herein. Those having skill in the art, with the knowledge gained from the present disclosure, will recognize that various changes could be made in these compositions and methods without departing from the scope of the present invention. Mechanisms used to explain theoretical or observed phenomena or results, shall be interpreted as illustrative only and not limiting in any way the scope of the appended claims.

The invention claimed is:

1. A fuel composition comprising:
   (a) from about 50% to 98% petroleum derived gasoline by weight;
   (b) from 1% to about 20% ethanol by volume; and
   (c) from 1% to about 30% pyrolysis derived gasoline by weight, wherein the pyrolysis derived gasoline is derived from hydroprocessing raw pyrolysis oil, and wherein the pyrolysis derived gasoline has a lower heating value from about 37 MJ/kg (15,900 BTU/lb) to about 46 MJ/kg (19,800 BTU/lb).

2. The fuel composition of claim 1, wherein the raw pyrolysis oil is derived from Rapid Thermal Processing (RTP).

3. The fuel composition of claim 1, wherein the raw pyrolysis oil is obtained from the pyrolysis of biomass selected from the group consisting of hardwood, softwood, hardwood bark, softwood bark, corn fiber, corn stover, sugar cane bagasse, switchgrass, miscanthus, algae, waste paper, construction waste, demolition waste, municipal waste, and mixtures thereof.

4. The fuel composition of claim 1, wherein the pyrolysis derived gasoline has a distillation end point temperature from about 138° C. (280° F.) to about 216° C. (420° F.).

5. The fuel composition of claim 1, wherein the pyrolysis derived gasoline comprises from about 0.02% to about 4% organic oxygenates by weight.

6. The fuel composition of claim 1, wherein the pyrolysis derived gasoline comprises at least about 97% hydrocarbons by weight.

7. The fuel composition of claim 1, wherein the pyrolysis derived gasoline comprises from about 55% to about 85% cyclic hydrocarbons by weight.

8. The fuel composition of claim 1, wherein the pyrolysis derived gasoline comprises less than about 3% combined benzene and toluene by weight.

9. The fuel composition of claim 1, wherein the pyrolysis derived gasoline has a research octane number (RON) from about 83 to about 93.

10. The fuel composition of claim 1, wherein the ethanol is derived from corn or sugar.

11. The fuel composition of claim 1, wherein the pyrolysis derived gasoline has a lifecycle greenhouse gas emission value from about 15 g $CO_2$-eq./MJ (34.9 lb $CO_2$ eq./mmBTU) to about 50 g $CO_2$-eq./MJ (116.3 lb $CO_2$ eq./mmBTU).

12. A fuel composition comprising from 1% to about 30% of pyrolysis derived gasoline, wherein the pyrolysis derived gasoline is derived from hydroprocessing raw pyrolysis oil, having a lifecycle greenhouse gas emission value from about 5 g$CO_2$-eq./MJ (11.6 lb $CO_2$ eq /mmBTU) to about 50 g$CO_2$-eq./MJ (116.3 lb $CO_2$ eq./mmBTU).

13. A fuel composition comprising:
   (a) from about 50% to 98% petroleum derived gasoline by weight;
   (b) from 1% to about 20% ethanol by volume; and
   (c) from 1% to about 30% pyrolysis derived gasoline by weight, wherein the pyrolysis derived gasoline is derived from hydroprocessing raw pyrolysis oil, and wherein the pyrolysis derived gasoline has a distillation end point temperature from about 138° C. (280° F.) to about 216° C. (420° F.).

14. The fuel composition of claim 13, wherein the raw pyrolysis oil is derived from Rapid Thermal Processing (RTP).

15. A fuel composition comprising:
   (a) from about 50% to 98% petroleum derived gasoline by weight;
   (b) from 1% to about 20% ethanol by volume; and
   (c) from 1% to about 30% pyrolysis derived gasoline by weight, wherein the pyrolysis derived gasoline is derived from hydroprocessing raw pyrolysis oil, and wherein the pyrolysis derived gasoline comprises from about 0.02% to about 4% organic oxygenates by weight.

16. The fuel composition of claim 15, wherein the raw pyrolysis oil is derived from Rapid Thermal Processing (RTP).

17. A fuel composition comprising:
   (a) from about 50% to 98% petroleum derived gasoline by weight;
   (b) from 1% to about 20% ethanol by volume; and
   (c) from 1% to about 30% pyrolysis derived gasoline by weight, wherein the pyrolysis derived gasoline is derived from hydroprocessing raw pyrolysis oil, and wherein the pyrolysis derived gasoline comprises at least about 97% hydrocarbons by weight.

18. The fuel composition of claim 17, wherein the raw pyrolysis oil is derived from Rapid Thermal Processing (RTP).

19. A fuel composition comprising:
   (a) from about 50% to 98% petroleum derived gasoline by weight;
   (b) from 1% to about 20% ethanol by volume; and
   (c) from 1% to about 30% pyrolysis derived gasoline by weight, wherein the pyrolysis derived gasoline is derived from hydroprocessing raw pyrolysis oil, and wherein the pyrolysis derived gasoline comprises from about 55% to about 85% cyclic hydrocarbons by weight.

20. A fuel composition comprising:
   (a) from about 50% to 98% petroleum derived gasoline by weight;
   (b) from 1% to about 20% ethanol by volume; and
   (c) from 1% to about 30% pyrolysis derived gasoline by weight, wherein the pyrolysis derived gasoline is derived from hydroprocessing raw pyrolysis oil, and wherein the pyrolysis derived gasoline comprises less than about 3% combined benzene and toluene by weight.

* * * * *